US011042045B2

(12) United States Patent
Chao et al.

(10) Patent No.: US 11,042,045 B2
(45) Date of Patent: Jun. 22, 2021

(54) ELECTRONIC EYEWEAR AND DISPLAY

(71) Applicant: IpVenture, Inc., San Jose, CA (US)

(72) Inventors: David Chao, Saratoga, CA (US);
Thomas A. Howell, San Jose, CA (US);
C. Douglass Thomas, Saratoga, CA (US); Peter P. Tong, Mountain View, CA (US)

(73) Assignee: IngenioSpec, LLC, San Jose, CA (US)

( * ) Notice: Subject to any disclaimer, the term of this patent is extended or adjusted under 35 U.S.C. 154(b) by 0 days.

(21) Appl. No.: 16/031,046

(22) Filed: Jul. 10, 2018

(65) Prior Publication Data

US 2018/0314079 A1    Nov. 1, 2018

Related U.S. Application Data

(63) Continuation of application No. 14/211,491, filed on Mar. 14, 2014, now Pat. No. 10,042,186.

(60) Provisional application No. 61/868,676, filed on Aug. 22, 2013, provisional application No. 61/792,702, filed on Mar. 15, 2013.

(51) Int. Cl.
*G02C 11/00* (2006.01)
(52) U.S. Cl.
CPC .................... *G02C 11/10* (2013.01)
(58) Field of Classification Search
CPC ............... G02C 11/10; G02B 27/0176; G02B 2027/0138; G02B 2027/0178; G02B 2027/0159; G02B 2027/0181; G02B 27/0179
USPC ........... 351/158; 345/7–8; 348/207.1, 62, 64
See application file for complete search history.

(56) References Cited

U.S. PATENT DOCUMENTS

| | | | |
|---|---|---|---|
| 320,558 | A | 6/1885 | Hull |
| 1,255,265 | A | 2/1918 | Zachara |
| 1,917,745 | A | 7/1933 | Weiss |
| 2,249,572 | A | 7/1941 | Lieber |

(Continued)

FOREIGN PATENT DOCUMENTS

| | | |
|---|---|---|
| CA | 2 487 391 | 12/2003 |
| CN | 88203065 | 11/1988 |

(Continued)

OTHER PUBLICATIONS

Office Action for U.S. Appl. No. 14/072,784, dated Jul. 27, 2015.

(Continued)

*Primary Examiner* — Wen Huang

(57) ABSTRACT

Novel eyewear apparatuses including a display are disclosed. In one embodiment, the apparatus also includes a frame. The frame includes a side region that includes an extendable arm. The first end of the extendable arm is attached to the frame and a second end of the extendable arm is attached to the display. The side region includes a cavity, where the extendable arm is adapted to retract back. The extendable arm is further adapted to extend out of the cavity and orient the display to be visually observable by a user of the eyewear apparatus. In another embodiment, the apparatus includes a concave reflective and an image source. The image source and the concave reflective surface are oriented to enable a user of the eyewear apparatus to view at least an image from the image source as reflected by the concave reflective surface.

35 Claims, 10 Drawing Sheets

(56) References Cited

U.S. PATENT DOCUMENTS

| | | | |
|---|---|---|---|
| 2,638,532 | A | 5/1953 | Brady |
| 2,794,085 | A | 5/1957 | De Angelis |
| 2,818,511 | A | 12/1957 | Ullery et al. |
| 2,830,132 | A | 4/1958 | Borg |
| 2,874,230 | A | 2/1959 | Carlson |
| 2,904,670 | A | 9/1959 | Calmes |
| 3,060,308 | A | 10/1962 | Fortuna |
| 3,597,054 | A | 8/1971 | Winter |
| 3,710,115 | A | 1/1973 | Jubb |
| 3,858,001 | A | 12/1974 | Bonne |
| 3,883,701 | A | 5/1975 | Delorenzo |
| 4,165,487 | A | 8/1979 | Corderman |
| 4,254,451 | A | 3/1981 | Cochran, Jr. |
| 4,283,127 | A | 8/1981 | Rosenwinkel et al. |
| 4,322,585 | A | 3/1982 | Liautaud |
| 4,348,664 | A | 9/1982 | Boschetti et al. |
| 4,389,217 | A | 6/1983 | Baughman et al. |
| 4,526,473 | A | 7/1985 | Zahn, III |
| 4,535,244 | A | 8/1985 | Burnham |
| 4,608,492 | A | 8/1986 | Burnham |
| 4,683,587 | A | 7/1987 | Silverman |
| 4,751,691 | A | 6/1988 | Perera |
| 4,757,714 | A | 7/1988 | Purdy et al. |
| 4,773,095 | A | 9/1988 | Zwicker et al. |
| 4,806,011 | A | 2/1989 | Bettinger |
| 4,822,160 | A | 4/1989 | Tsai |
| 4,822,161 | A | 4/1989 | Jimmy |
| 4,851,686 | A | 7/1989 | Pearson |
| 4,856,086 | A | 8/1989 | McCullough |
| 4,859,047 | A | 8/1989 | Badewitz |
| 4,882,769 | A | 11/1989 | Gallimore |
| 4,904,078 | A | 2/1990 | Gorike |
| 4,942,629 | A | 7/1990 | Stadlmann |
| 4,962,469 | A | 10/1990 | Ono et al. |
| 4,967,268 | A | 10/1990 | Lipton et al. |
| 4,985,632 | A | 1/1991 | Bianco et al. |
| 5,008,548 | A | 4/1991 | Gat |
| 5,015,086 | A | 5/1991 | Okaue et al. |
| 5,020,150 | A | 5/1991 | Shannon |
| 5,026,151 | A | 6/1991 | Waltuck et al. |
| 5,036,311 | A | 7/1991 | Moran et al. |
| 5,050,150 | A | 9/1991 | Ikeda |
| 5,064,410 | A | 11/1991 | Frenkel et al. |
| 5,093,576 | A | 3/1992 | Edmond et al. |
| 5,106,179 | A | 4/1992 | Kamaya et al. |
| 5,148,023 | A | 9/1992 | Hayashi et al. |
| 5,151,600 | A | 9/1992 | Black |
| 5,161,250 | A | 11/1992 | Ianna et al. |
| 5,172,256 | A | 12/1992 | Sethofer et al. |
| 5,264,877 | A | 11/1993 | Hussey |
| 5,306,917 | A | 4/1994 | Black et al. |
| 5,353,378 | A | 10/1994 | Hoffman et al. |
| 5,359,370 | A | 10/1994 | Mugnier |
| 5,359,444 | A | 10/1994 | Piosenka et al. |
| 5,367,345 | A | 11/1994 | da Silva |
| 5,379,464 | A | 1/1995 | Schleger et al. |
| 5,382,986 | A | 1/1995 | Black et al. |
| 5,394,005 | A | 2/1995 | Brown et al. |
| 5,452,026 | A | 9/1995 | Marcy, III |
| 5,452,480 | A | 9/1995 | Ryden |
| 5,455,637 | A | 10/1995 | Kallman et al. |
| 5,455,640 | A | 10/1995 | Gertsikov |
| 5,457,751 | A | 10/1995 | Such |
| 5,463,428 | A | 10/1995 | Lipton et al. |
| 5,500,532 | A | 3/1996 | Kozicki |
| D369,167 | S | 4/1996 | Hanson et al. |
| 5,510,961 | A | 4/1996 | Peng |
| 5,513,384 | A | 4/1996 | Brennan et al. |
| 5,533,130 | A | 7/1996 | Staton |
| 5,541,641 | A | 7/1996 | Shimada |
| 5,581,090 | A | 12/1996 | Goudjil |
| 5,585,871 | A | 12/1996 | Linden |
| 5,589,398 | A | 12/1996 | Krause et al. |
| 5,590,417 | A | 12/1996 | Rydbeck |
| 5,606,743 | A | 2/1997 | Vogt et al. |
| 5,608,808 | A | 3/1997 | da Silva |
| 5,634,201 | A | 5/1997 | Mooring |
| 5,671,035 | A | 9/1997 | Barnes |
| 5,686,727 | A | 11/1997 | Reenstra et al. |
| 5,694,475 | A | 12/1997 | Boyden |
| 5,715,323 | A | 2/1998 | Walker |
| 5,737,436 | A | 4/1998 | Boyden et al. |
| 5,818,381 | A | 10/1998 | Williams |
| 5,835,185 | A | 11/1998 | Kallman et al. |
| 5,900,720 | A | 5/1999 | Kallman et al. |
| 5,903,395 | A | 5/1999 | Rallison et al. |
| 5,923,398 | A | 7/1999 | Goldman |
| 5,941,837 | A | 8/1999 | Amano et al. |
| 5,946,071 | A | 8/1999 | Feldman |
| 5,949,516 | A | 9/1999 | McCurdy |
| 5,966,746 | A | 10/1999 | Reedy et al. |
| 5,980,037 | A | 11/1999 | Conway |
| 5,988,812 | A | 11/1999 | Wingate |
| 5,991,085 | A | 11/1999 | Rallison et al. |
| 5,992,996 | A | 11/1999 | Sawyer |
| 5,995,592 | A | 11/1999 | Shirai et al. |
| 6,010,216 | A | 1/2000 | Jesiek |
| 6,013,919 | A | 1/2000 | Schneider et al. |
| 6,028,627 | A | 2/2000 | Helmsderfer |
| 6,046,455 | A | 4/2000 | Ribi et al. |
| 6,060,321 | A | 5/2000 | Hovorka |
| 6,061,580 | A | 5/2000 | Altschul et al. |
| 6,091,546 | A | 7/2000 | Spitzer |
| 6,091,832 | A | 7/2000 | Shurman et al. |
| 6,115,177 | A | 9/2000 | Vossler |
| 6,132,681 | A | 10/2000 | Faran et al. |
| 6,145,983 | A | 11/2000 | Schiffer |
| 6,154,552 | A | 11/2000 | Koroljow et al. |
| 6,176,576 | B1 | 1/2001 | Green et al. |
| 669,949 | A1 | 3/2001 | Underwood |
| 6,225,897 | B1 | 5/2001 | Doyle et al. |
| 6,231,181 | B1 | 5/2001 | Swab |
| 6,236,969 | B1 | 5/2001 | Ruppert et al. |
| 6,243,578 | B1 | 6/2001 | Koike |
| 6,259,367 | B1 | 7/2001 | Klein |
| 6,270,466 | B1 | 8/2001 | Weinstein et al. |
| 6,292,213 | B1 | 9/2001 | Jones |
| 6,292,685 | B1 | 9/2001 | Pompei |
| 6,301,367 | B1 | 10/2001 | Boyden et al. |
| 6,307,526 | B1 | 10/2001 | Mann |
| 6,343,858 | B1 | 2/2002 | Zelman |
| 6,349,001 | B1 | 2/2002 | Spitzer |
| 6,349,422 | B1 | 2/2002 | Schleger et al. |
| 6,409,335 | B1 | 6/2002 | Lipawsky |
| 6,409,338 | B1 | 6/2002 | Jewell |
| 6,426,719 | B1 | 7/2002 | Nagareda et al. |
| 6,431,705 | B1 | 8/2002 | Linden |
| 6,474,816 | B2 | 11/2002 | Butler et al. |
| 6,478,736 | B1 | 11/2002 | Mault |
| 6,506,142 | B2 | 1/2003 | Itoh et al. |
| 6,511,175 | B2 | 1/2003 | Hay et al. |
| 6,513,532 | B2 | 2/2003 | Mault et al. |
| 6,517,203 | B1 | 2/2003 | Blum et al. |
| 6,539,336 | B1 | 3/2003 | Vock et al. |
| 6,542,081 | B2 | 4/2003 | Torch |
| 6,546,101 | B1 | 4/2003 | Murray et al. |
| 6,554,763 | B1 | 4/2003 | Amano et al. |
| 6,582,075 | B1 | 6/2003 | Swab et al. |
| 6,619,799 | B1 | 9/2003 | Blum et al. |
| 6,629,076 | B1 | 9/2003 | Haken |
| 6,729,726 | B2 | 5/2004 | Miller et al. |
| 6,736,759 | B1 | 5/2004 | Stubbs et al. |
| 6,764,194 | B1 | 7/2004 | Cooper |
| 6,769,767 | B2 | 8/2004 | Swab et al. |
| 6,788,309 | B1 | 9/2004 | Swan et al. |
| 6,792,401 | B1 | 9/2004 | Nigro et al. |
| 6,816,314 | B2* | 11/2004 | Shimizu .......... G02B 27/0172 345/7 |
| 6,824,265 | B1 | 11/2004 | Harper |
| 6,857,741 | B2 | 2/2005 | Blum et al. |
| 6,871,951 | B2 | 3/2005 | Blum et al. |
| 6,879,930 | B2 | 4/2005 | Sinclair et al. |
| 6,912,386 | B1 | 6/2005 | Himberg et al. |
| 6,929,365 | B2 | 8/2005 | Swab et al. |

(56) References Cited

U.S. PATENT DOCUMENTS

| | | |
|---|---|---|
| 6,932,090 B1 | 8/2005 | Reschke et al. |
| 6,947,219 B1 | 9/2005 | Ou |
| 7,004,582 B2 | 2/2006 | Jannard et al. |
| 7,013,009 B2 | 3/2006 | Warren |
| 7,023,594 B2 | 4/2006 | Blum et al. |
| 7,030,902 B2 | 4/2006 | Jacobs |
| 7,031,667 B2 | 4/2006 | Horiguchi |
| 7,033,025 B2 | 4/2006 | Winterbotham |
| 7,059,717 B2 | 6/2006 | Bloch |
| 7,073,905 B2 | 7/2006 | Da Pra' |
| 7,079,876 B2 | 7/2006 | Levy |
| 7,123,215 B2 | 10/2006 | Nakada |
| 7,192,136 B2 | 3/2007 | Howell et al. |
| 7,255,437 B2 | 8/2007 | Howell et al. |
| 7,265,358 B2 | 9/2007 | Fontaine |
| 7,274,292 B2 | 9/2007 | Velhal et al. |
| 7,289,767 B2 | 10/2007 | Lai |
| 7,312,699 B2 | 12/2007 | Chornenky |
| 7,331,666 B2 | 2/2008 | Swab et al. |
| 7,376,238 B1 | 5/2008 | Rivas et al. |
| 7,380,936 B2 | 6/2008 | Howell et al. |
| 7,401,918 B2 | 7/2008 | Howell et al. |
| 7,405,801 B2 | 7/2008 | Jacobs |
| 7,429,965 B2 | 9/2008 | Weiner |
| 7,438,409 B2 | 10/2008 | Jordan |
| 7,438,410 B1 | 10/2008 | Howell et al. |
| 7,445,332 B2 | 11/2008 | Jannard et al. |
| 7,481,531 B2 | 1/2009 | Howell et al. |
| 7,500,746 B1 | 3/2009 | Howell et al. |
| 7,500,747 B2 | 3/2009 | Howell et al. |
| 7,512,414 B2 | 3/2009 | Jannard et al. |
| 7,517,083 B2 | 4/2009 | Blum et al. |
| 7,527,374 B2 | 5/2009 | Chou |
| 7,543,934 B2 | 6/2009 | Howell et al. |
| 7,581,833 B2 | 9/2009 | Howell et al. |
| 7,621,634 B2 | 11/2009 | Howell et al. |
| 7,648,236 B1 | 1/2010 | Dobson |
| 7,677,723 B2 | 3/2010 | Howell et al. |
| 7,760,898 B2 | 7/2010 | Howell et al. |
| 7,771,046 B2 | 8/2010 | Howell et al. |
| 7,792,552 B2 | 9/2010 | Thomas et al. |
| 7,806,525 B2 | 10/2010 | Howell et al. |
| 7,922,321 B2 | 4/2011 | Howell et al. |
| 7,976,159 B2 | 7/2011 | Jacobs et al. |
| 8,109,629 B2 | 2/2012 | Howell et al. |
| 8,142,015 B2 | 3/2012 | Paolino |
| 8,174,569 B2 | 5/2012 | Tanijiri et al. |
| 8,337,013 B2 | 12/2012 | Howell et al. |
| 8,430,507 B2 | 4/2013 | Howell et al. |
| 8,434,863 B2 | 5/2013 | Howell et al. |
| 8,465,151 B2 | 6/2013 | Howell et al. |
| 8,485,661 B2 | 7/2013 | Yoo et al. |
| 8,500,271 B2 | 8/2013 | Howell et al. |
| 8,770,742 B2 | 7/2014 | Howell et al. |
| 8,905,542 B2 | 12/2014 | Howell et al. |
| 9,033,493 B2 | 5/2015 | Howell et al. |
| 9,244,292 B2 | 1/2016 | Swab et al. |
| 9,400,390 B2 | 7/2016 | Osterhout et al. |
| 9,405,135 B2 | 8/2016 | Sweis et al. |
| 9,488,520 B2 | 11/2016 | Howell et al. |
| 9,547,184 B2 | 1/2017 | Howell et al. |
| 9,690,121 B2 | 6/2017 | Howell et al. |
| 10,042,186 B2 | 8/2018 | Chao et al. |
| 10,060,790 B2 | 8/2018 | Howell et al. |
| 10,061,144 B2 | 8/2018 | Howell et al. |
| 10,310,296 B2 | 6/2019 | Howell et al. |
| 10,345,625 B2 | 7/2019 | Howell et al. |
| 10,359,311 B2 | 7/2019 | Howell et al. |
| 10,359,459 B1 | 7/2019 | Gorin |
| 10,624,790 B2 | 4/2020 | Chao et al. |
| 10,777,048 B2 | 9/2020 | Howell et al. |
| 2001/0005230 A1 | 6/2001 | Ishikawa |
| 2001/0028309 A1 | 10/2001 | Torch |
| 2001/0050754 A1 | 12/2001 | Hay et al. |
| 2002/0017997 A1 | 2/2002 | Felkowitz |
| 2002/0021407 A1 | 2/2002 | Elliott |
| 2002/0081982 A1 | 6/2002 | Schwartz et al. |
| 2002/0084990 A1 | 7/2002 | Peterson, III |
| 2002/0089639 A1 | 7/2002 | Starner et al. |
| 2002/0090103 A1 | 7/2002 | Calisto, Jr. |
| 2002/0098877 A1 | 7/2002 | Glezerman |
| 2002/0101568 A1 | 8/2002 | Eberl et al. |
| 2002/0109600 A1 | 8/2002 | Mault et al. |
| 2002/0140899 A1 | 10/2002 | Blum et al. |
| 2002/0159023 A1 | 10/2002 | Swab |
| 2002/0197961 A1 | 12/2002 | Warren |
| 2003/0018274 A1 | 1/2003 | Takahashi et al. |
| 2003/0022690 A1 | 1/2003 | Beyda et al. |
| 2003/0032449 A1 | 2/2003 | Giobbi |
| 2003/0062046 A1 | 4/2003 | Wiesmann et al. |
| 2003/0065257 A1 | 4/2003 | Mault et al. |
| 2003/0067585 A1 | 4/2003 | Miller et al. |
| 2003/0068057 A1 | 4/2003 | Miller et al. |
| 2003/0083591 A1 | 5/2003 | Edwards et al. |
| 2003/0214630 A1 | 11/2003 | Winterbotham |
| 2003/0226978 A1 | 12/2003 | Ribi et al. |
| 2003/0231293 A1 | 12/2003 | Blum et al. |
| 2004/0000733 A1 | 1/2004 | Swab et al. |
| 2004/0029582 A1 | 2/2004 | Swab et al. |
| 2004/0059212 A1 | 3/2004 | Abreu |
| 2004/0063378 A1 | 4/2004 | Nelson |
| 2004/0096078 A1 | 5/2004 | Lin |
| 2004/0100384 A1 | 5/2004 | Chen et al. |
| 2004/0101178 A1 | 5/2004 | Fedorovskaya et al. |
| 2004/0128737 A1 | 7/2004 | Gesten |
| 2004/0150986 A1 | 8/2004 | Chang |
| 2004/0156012 A1 | 8/2004 | Jannard et al. |
| 2004/0157649 A1 | 8/2004 | Jannard et al. |
| 2004/0160571 A1 | 8/2004 | Jannard |
| 2004/0160572 A1 | 8/2004 | Jannard |
| 2004/0160573 A1 | 8/2004 | Jannard et al. |
| 2004/0197002 A1 | 10/2004 | Atsumi et al. |
| 2004/0227219 A1 | 11/2004 | Su |
| 2005/0067580 A1 | 3/2005 | Fontaine |
| 2005/0078274 A1 | 4/2005 | Howell et al. |
| 2005/0088365 A1 | 4/2005 | Yamazaki et al. |
| 2005/0201585 A1 | 9/2005 | Jannard et al. |
| 2005/0213026 A1 | 9/2005 | Da Pra' |
| 2005/0230596 A1 | 10/2005 | Howell et al. |
| 2005/0238194 A1 | 10/2005 | Chornenky |
| 2005/0239502 A1 | 10/2005 | Swab et al. |
| 2005/0248717 A1 | 11/2005 | Howell et al. |
| 2005/0248718 A1 | 11/2005 | Howell et al. |
| 2005/0248719 A1 | 11/2005 | Howell et al. |
| 2005/0264752 A1 | 12/2005 | Howell et al. |
| 2006/0001827 A1 | 1/2006 | Howell et al. |
| 2006/0003803 A1 | 1/2006 | Thomas et al. |
| 2006/0023158 A1 | 2/2006 | Howell et al. |
| 2006/0034478 A1 | 2/2006 | Davenport |
| 2006/0107822 A1 | 5/2006 | Bowen |
| 2006/0132382 A1 | 6/2006 | Jannard |
| 2007/0030442 A1 | 2/2007 | Howell et al. |
| 2007/0035830 A1 | 2/2007 | Matveev et al. |
| 2007/0046887 A1 | 3/2007 | Howell et al. |
| 2007/0055888 A1 | 3/2007 | Miller et al. |
| 2007/0098192 A1 | 5/2007 | Sipkema |
| 2007/0109491 A1 | 5/2007 | Howell et al. |
| 2007/0186330 A1 | 8/2007 | Howell et al. |
| 2007/0200927 A1 | 8/2007 | Krenik |
| 2007/0208531 A1 | 9/2007 | Darley et al. |
| 2007/0270663 A1 | 11/2007 | Ng et al. |
| 2007/0271065 A1 | 11/2007 | Gupta et al. |
| 2007/0271116 A1 | 11/2007 | Wysocki et al. |
| 2007/0271387 A1 | 11/2007 | Lydon et al. |
| 2007/0279584 A1 | 12/2007 | Howell et al. |
| 2008/0062338 A1 | 3/2008 | Herzog et al. |
| 2008/0068559 A1 | 3/2008 | Howell et al. |
| 2008/0100792 A1 | 5/2008 | Blum et al. |
| 2008/0144854 A1 | 6/2008 | Abreu |
| 2008/0151175 A1 | 6/2008 | Gross |
| 2008/0151179 A1 | 6/2008 | Howell et al. |
| 2008/0158506 A1 | 7/2008 | Fuziak |
| 2008/0218684 A1 | 9/2008 | Howell et al. |
| 2008/0262392 A1 | 10/2008 | Ananny et al. |

(56) References Cited

U.S. PATENT DOCUMENTS

| | | |
|---|---|---|
| 2008/0278678 A1 | 11/2008 | Howell et al. |
| 2009/0059159 A1 | 3/2009 | Howell et al. |
| 2009/0059381 A1* | 3/2009 | Jannard ............... H04N 9/3173 359/630 |
| 2009/0073375 A1 | 3/2009 | Nakada |
| 2009/0141233 A1 | 6/2009 | Howell et al. |
| 2009/0147215 A1 | 6/2009 | Howell et al. |
| 2009/0156128 A1 | 6/2009 | Franson et al. |
| 2009/0251660 A1 | 10/2009 | Figler et al. |
| 2009/0251661 A1 | 10/2009 | Fuziak, Jr. |
| 2009/0296044 A1 | 12/2009 | Howell et al. |
| 2010/0061579 A1 | 3/2010 | Rickards et al. |
| 2010/0079356 A1 | 4/2010 | Hoellwarth |
| 2010/0110368 A1 | 5/2010 | Chaum |
| 2010/0245754 A1 | 9/2010 | Matsumoto et al. |
| 2010/0296045 A1 | 11/2010 | Agnoli et al. |
| 2010/0309426 A1 | 12/2010 | Howell et al. |
| 2011/0102734 A1 | 5/2011 | Howell et al. |
| 2011/0164122 A1 | 7/2011 | Hardacker |
| 2011/0187990 A1 | 8/2011 | Howell et al. |
| 2011/0241976 A1 | 10/2011 | Boger et al. |
| 2011/0273365 A1 | 11/2011 | West et al. |
| 2012/0033061 A1 | 2/2012 | Ko et al. |
| 2012/0050668 A1 | 3/2012 | Howell et al. |
| 2012/0133885 A1 | 3/2012 | Howell et al. |
| 2012/0176580 A1 | 7/2012 | Sonsino |
| 2013/0072828 A1 | 3/2013 | Sweis et al. |
| 2013/0077175 A1* | 3/2013 | Hotta ....................... G02B 3/08 359/630 |
| 2013/0143519 A1 | 6/2013 | Doezema |
| 2013/0201440 A1 | 8/2013 | Howell et al. |
| 2013/0308089 A1 | 11/2013 | Howell et al. |
| 2014/0132913 A1 | 5/2014 | Sweis et al. |
| 2014/0176902 A1 | 6/2014 | Sweis et al. |
| 2014/0198293 A1 | 7/2014 | Sweis et al. |
| 2014/0268008 A1 | 9/2014 | Howell et al. |
| 2014/0268013 A1 | 9/2014 | Howell et al. |
| 2014/0268017 A1 | 9/2014 | Sweis et al. |
| 2014/0361185 A1 | 12/2014 | Howell et al. |
| 2015/0085245 A1 | 3/2015 | Howell et al. |
| 2015/0230988 A1 | 8/2015 | Chao et al. |
| 2015/0253590 A1 | 9/2015 | Howell et al. |
| 2016/0246075 A9 | 8/2016 | Howell et al. |
| 2016/0302992 A1 | 10/2016 | Sweis et al. |
| 2017/0068117 A9 | 3/2017 | Howell et al. |
| 2017/0074721 A1 | 3/2017 | Howell et al. |
| 2017/0090219 A1 | 3/2017 | Howell et al. |
| 2017/0131575 A1 | 5/2017 | Howell et al. |
| 2017/0146829 A1 | 5/2017 | Howell et al. |
| 2017/0303187 A1 | 10/2017 | Crouthamel et al. |
| 2018/0335650 A1 | 11/2018 | Howell et al. |
| 2018/0348050 A1 | 12/2018 | Howell et al. |
| 2019/0033623 A1 | 1/2019 | Howell et al. |
| 2019/0187492 A1 | 6/2019 | Howell et al. |
| 2019/0272800 A1 | 9/2019 | Tao et al. |
| 2019/0278110 A1 | 9/2019 | Howell et al. |
| 2019/0285913 A1 | 9/2019 | Howell et al. |
| 2019/0310132 A1 | 10/2019 | Howell et al. |
| 2019/0318589 A1 | 10/2019 | Howell et al. |
| 2019/0387351 A1 | 12/2019 | Lyren et al. |
| 2020/0012127 A1 | 1/2020 | Howell et al. |
| 2020/0218094 A1 | 7/2020 | Howell et al. |
| 2020/0364992 A1 | 11/2020 | Howell et al. |

FOREIGN PATENT DOCUMENTS

| | | |
|---|---|---|
| CN | 89214222.7 | 3/1990 |
| CN | 90208199.3 | 11/1990 |
| DE | 10123226 A1 | 11/2002 |
| EP | 1134491 A2 | 9/2001 |
| FR | 2530039 A1 | 1/1984 |
| GB | 1467982 | 3/1977 |
| JP | 58-113912 | 7/1983 |
| JP | 58-113914 | 7/1983 |
| JP | 02-181722 | 7/1990 |
| JP | 09-017204 | 1/1997 |
| JP | 10-161072 | 7/1998 |
| JP | 2000-039595 | 2/2000 |
| JP | 2002 341059 A | 11/2002 |
| JP | 2005-151292 | 6/2005 |
| TW | 484711 | 6/2001 |
| WO | WO 97/12205 A1 | 4/1997 |
| WO | WO 99/50706 A1 | 10/1999 |
| WO | WO 01/06298 A1 | 1/2001 |
| WO | WO 02/06881 A2 | 1/2002 |
| WO | WO 03/069394 A1 | 8/2003 |
| WO | WO 03/100368 A1 | 12/2003 |
| WO | WO 03/100503 A2 | 12/2003 |
| WO | WO 04/012477 A2 | 2/2004 |
| WO | WO 04/025554 A1 | 3/2004 |
| WO | WO 10/0141514 A2 | 12/2010 |

OTHER PUBLICATIONS

Office Action for U.S. Appl. No. 14/072,784, dated Oct. 29, 2015.
Notice of Allowance for U.S. Appl. No. 14/072,784, dated Jan. 14, 2016.
Notice of Allowance for U.S. Appl. No. 14/072,784, dated Apr. 7, 2016.
Office Action for U.S. Appl. No. 15/193,155, dated Sep. 26, 2016.
Office Action for U.S. Appl. No. 15/193,155, dated Jun. 8, 2017.
Office Action for U.S. Appl. No. 14/190,352, dated Oct. 26, 2016.
Office Action for U.S. Appl. No. 14/190,352, dated May 4, 2017.
Office Action for U.S. Appl. No. 14/703,875, dated Oct. 5, 2016.
Office Action for U.S. Appl. No. 14/703,875, dated May 17, 2017.
Office Action for U.S. Appl. No. 14/703,875, dated Apr. 12, 2018.
Restriction Requirement for U.S. Appl. No. 14/217,174, dated Mar. 28, 2016.
Office Action for U.S. Appl. No. 14/217,174, dated Jul. 28, 2016.
Office Action for U.S. Appl. No. 14/217,174, dated Feb. 10, 2017.
Restriction Requirement for U.S. Appl. No. 14/211,491, dated Jul. 16, 2015.
Office Action for U.S. Appl. No. 14/211,491, dated Oct. 19, 2015.
Office Action for U.S. Appl. No. 14/211,491, dated Feb. 23, 2016.
Notice of Allowance for U.S. Appl. No. 14/211,491, dated Nov. 9, 2016.
Notice of Allowance for U.S. Appl. No. 14/211,491, dated May 26, 2017.
Office Action for U.S. Appl. No. 14/211,491, dated Oct. 11, 2017.
Notice of Allowance for U.S. Appl. No. 14/211,491, dated Apr. 9, 2018.
"±1.5g Dual Axis Micromachined Accelerometer", Freescale Semiconductor, Inc., Motorola Semiconductor Technical Data, MMA6260Q, Jun. 2004, pp. 1-7.
"APA Announces Shipment of the SunUV™ Personal UV Monitor", Press Release, Nov. 7, 2003, pp. 1-3.
"Camera Specs Take Candid Snaps", BBC News, Sep. 18, 2003, pp. 1-3.
"Cardo Wireless Attaching Clips and Wearing Headset", Cardo Systems, Inc., http://www.cardowireless.com/clips php, downloaded Nov. 27, 2004, pp. 1-3.
"Environmental Health Criteria 14: Ultraviolet Radiation", International Programme on Chemical Safety, World Health Organization Geneva, 1979 http://www.ichem.org., pp. 1-102.
"Exclusive Media Event Marks Debut of Oakley Thump: World's First Digital Audio Eyewear", Oakley Investor Relations, Press Release, Nov. 15, 2004, pp. 1-2.
"Eyetop", Product-Features, eyetop eyewear, eyetop belt worn, http://www.eyetop.net/products/eyetop/features.asp., downloaded Nov. 6, 2003, pp. 1-2.
"Heart Rate Monitors", http://www.healthgoods.com, downloaded Dec. 4, 2004.
"How is the UV Index Calculated", SunWise Program, U.S. Environmental Protection Agency, http://www.epa.gov/sunwise/uvcalc.html, downloaded Oct. 14, 2004, pp. 1-2.
"Industrial UV Measurements", APA Optics, Inc., http://www.apaoptics.com/uv/, downloaded Jul. 12, 2004, p. 1.

(56) References Cited

OTHER PUBLICATIONS

"Motorola and Oakley Introduce First Bluetooth Sunglasses-Cutting Edge RAZRWire Line Offers Consumers On-The-Go Connections", Motorola Mediacenter-Press Release, Feb. 14, 2005, pp. 1-2.
"Oakley Thump: Sunglasses Meet MP3 Player", with image, http://news.designtechnica.com/article4665.html, Jul. 13, 2004.
"Personal UV monitor," Optics.org, http://optics.org/articles/news/6/6/7/1 (downloaded Dec. 20, 2003), Jun. 9, 2000, pp. 1-2.
"SafeSun Personal Ultraviolet Light Meter", http://healthchecksystems.com/safesun.htm, downloaded Jul. 12, 2004, pp. 1-4.
"SafeSun Personal UV Meter", Introduction, Optix Tech Inc., http://www.safesun.com, downloaded Feb. 5, 2004, pp. 1-2.
SafeSun Personal UV Meter, features, Optix Tech Inc., http://www.safesun.com/features.html, downloaded May 1, 2004, pp. 1-2.
"Sharper Image—The FM Pedometer", e-Corporate Gifts.com, http://www.e-corporategifts.com/sr353.html, downloaded Jan. 22, 2005, pp. 1-2.
"Sun UV™ Personal UV Monitor", APA Optics, Inc., http://www.apaoptics.com/sunuv/uvfacts.html, downloaded Dec. 20, 2003, pp. 1-3.
"Ultraviolet Light and Sunglasses", Oberon's Frequently Asked Questions, http://www.oberoncompany.com/OBEnglish/FAQUV.html, downloaded Feb. 5, 2004, pp. 1-2.
"Ultraviolet Light Sensor", Barrett & Associates Engineering, http://www.barrettengineering.com/project_uvs.htm, downloaded Feb. 5, 2004, pp. 1-3.
"Ultraviolet Radiation (UVR)", Forum North, Ontario Ministry of Labour, http://www3.mb.sympatico.ca/~ericc/ULTRAVIOLET%20RADIATION.htm, downloaded Feb. 5, 2004, pp. 1-6.
"What Are Gripples?", Gripping Eyewear, Inc., http://www.grippingeyewear.com/whatare.html, downloaded Nov. 2, 2005.
"With Racing Heart", Skaloud et al., GPS World, Oct. 1, 2001, http://www.gpsworld.com/gpsworld/content/printContentPopup.jsp?id=1805, pp. 1-5.
Abrisa Product Information: Cold Mirrors, Abrisa, Jun. 2001, p. 1.
Abrisa Product Information: Commercial Hot Mirror, Abrisa, Jun. 2001, p. 1.
Alps Spectacle, Air Conduction Glass, Bone Conduction Glass, http://www.alps-inter.com/spec.htm, downloaded Dec. 10, 2003, pp. 1-2.
Altimeter and Compass Watches, http://store.yahoo.com/snowshack/altimeter-watches.html, downloaded May 3, 2004, pp. 1-2.
Pediatric Eye Disease Group,"Randomized Trial of Treatment of Amblyopia in Children Aged 7 to 17 Years," Roy W. Beck, M.D., Ph.D. Section Ed., Originally Published and Reprinted from Arch Ophthalmol, v. 123, Apr. 2005, pp. 437-447, http;//archopht.jamanetwork.com/ by a new England College of Optometry User on Dec. 20, 2012.
Bone Conduction Headgear HG16 Series, "Voiceducer," http://www.temco-j.co.jp/html/English/HG16.html, downloaded Dec. 10, 2003, pp. 1-3.
Carnoy, David, "The Ultimate MP3 Player for Athletes? Could be.", CNET Reviews, May 14, 2004, pp. 1-4.
Clifford, Michelle A., "Accelerometers Jump into the Consumer Goods Marker", Sensors Online, http://www.sensorsmag.com, Aug. 2004.
Comfees.com, Adjustable Sports Band Style No. 1243, http://shop.store.yahoo.com/comfees/adsportbansty.html, downloaded Apr. 18, 2003, pp. 1-2.
Cool Last Minute Gift Ideas!, UltimateFatBurner Reviews and Articles, http://www.ultimatefatburner.com/gift-ideas.html, downloaded May 10, 2005, pp. 1-3.
Dickie et al. "Eye Contact Sensing Glasses for Attention-Sensitive Wearable Video Blogging," Human Media Lab, Queen's University, Kingston, ON K7L 3N6, Canada, est. Apr. 2004, pp. 1-2.
Dixen, Brian, "ear-catching", Supertesten, Mobil, Apr. 2003 (estimated), pp. 37-41.
Global Solar UV Index, A Practical Guide, World Health Organization, 2002, pp. 1-28.
Grobart, Sam, "Digit-Sizing Your Computer Data", News Article, Sep. 2004, p. 1.
Holmes, JM et al. "A randomized trial of prescribed patching regimens for treatment of severe amblyopia in children." Ophthalmology, v. 110, Iss.11, Nov. 2003, pp. 2075-2087.
Life Monitor V1.1, Rhusoft Technologies Inc., http://www.rhusoft.com/lifemonitor/, Mar. 1, 2003, pp. 1-6.
Manes, Stephen, "Xtreme Cam", Forbes Magazine, Sep. 5, 2005, p. 96.
Mio, PhysiCal, http://www.gophysical.com/, downloaded Jan. 27, 2004, 5 pages.
Monitoring Athletes Performance-2002 Winter Olympic News from KSL, Jan. 23, 2002, http://2002.ksl.com/news-3885i, pp. 1-3.
NIWA, "UV Index Information", http://www.niwa.cri.nz/services/uvozone/uvi-info, downloaded Jul. 15, 2004, pp. 1-2.
NuVision 60GX Steroscopic Wireless Glasses, Product Information, NuVision by MacNaughton, c. 1997, MacNaughton, Inc., pp. 1-2.
Pärkkä, Juha, et al., "A Wireless Wellness Monitor for Personal Weight Management", VTT Information Technology, Tampere, Finland, Nov. 2000, p. 1.
Pedometer, Model HJ-112, Omron Instruction Manual, Omron Healthcare, Inc., 2003, pp. 1-27.
PNY Announces Executive Attaché USB 2.0 Flash Drive and Pen Series, Press Release, PNY Technologies, Las Vegas, Jan. 8, 2004, pp. 1-2.
PNY Technologies, "Executive Attaché" http://www.pny.com/products/flash/execattache.asp downloaded Nov. 16, 2005.
Polar WM41 and 42 weight management monitor, http://www.simplysports/polar/weight_management/wm41-42.htm, downloaded Jan. 28, 2004, pp. 1-3.
Questions Answers, Pedometer.com, http://www.pedometer.com, downloaded May 5, 2005.
RazrWire, copyright Motorola, Inc., Jul. 2005, 1 page.
Repka MX et al. "A randomized trial of patching regimens for treatment of moderate amblyopia in children." *Arch Ophthalmology* v. 121, No. 5, May 2003, pp. 603-611.
SafeSun Personal UV Meter, Scientific Data, Optix Tech Inc., http://www.safesun.com/scientific.html, downloaded May 1, 2004, pp. 1-3.
SafeSun Sensor, User's Manual, Optix Tech Inc., Jun. 1998, 2 pages.
SafeSun, Personal UV Meter, "Technical Specifications", Optix Tech Inc., http://www.safesun.com/technical.html, downloaded Jul. 12, 2004, pp. 1-2.
SafeSun, Personal UV Meter, Experiments, Optix Tech Inc., http://www.safesun.com/experiments.html, downloaded Feb. 5, 2004, pp. 1-2.
Shades of Fun, Blinking Light Glasses, http://www.shadesoffun.com/Nov/Novpgs-14.html downloaded Jul. 9, 2005, pp. 1-4.
SportLine Fitness Pedometer-Model 360, UltimateFatBurner Superstore, http://www.ultimatefatburner-store.com/ac_004.html, downloaded May 10, 2005, pp. 1-2.
Steele, Bonnie G. et al., "Bodies in motion: Monitoring daily activity and exercise with motion sensors in people with chronic pulmonary disease", VA Research & Development, Journal of Rehabilitation Research & Development, vol. 40, No. 5, Sep./Oct. 2003, Supplement 2, pp. 45-58.
Stevens, Kathy, "Should I Use a Pedometer When I Walk?", Healtheon/WebMD, Apr. 14, 2000.
Sundgot, Jørgen "2nd-gen Motorola Bluetooth headset", InfoSync World, Mar. 1, 2003, http://www.infosync.no/news/2002/n/2841.html, pp. 1-2.
SunSensors, Segan Industries, Inc., http://www.segan-ind.com/sunsensor.htm, downloaded Feb. 5, 2004, pp. 1-3.
SunUV™, Personal UV Monitor User's Guide, APA Optics, Inc., 2003 pp. 1-52.
SunUV™, Personal UV Monitor, APA Optics, Inc., http://www.apaoptics.com/sunuv/models.html, downloaded Dec. 20, 2003.
Talking Pedometer, Sportline, Inc., Jun. 2001 (*Possibly earlier*), 1 page.
The unofficial ELSA 3D Revelator page, Dec. 30, 1999, pp. 1-15.

(56) References Cited

OTHER PUBLICATIONS

Top Silicon PIN Photodiode, PD93-21C, Technical Data Sheet, Everlight Electronics Co., Ltd., 2004, pp. 1-9.
UV Light Meter, UVA and UVB measurement, UV-340, Instruction Manual, Lutron, Jun. 2003 (estimated), pp. 1-5.
UV-Smart, UVA/B Monitor, Model EC-960-PW, Instruction Manual, Tanita Corporation of America, Inc., downloaded Nov. 16, 2001.
Vitaminder Personal Carb Counter, http://www.auravita.com/products/AURA/ORBU11420.asp. Downloaded Nov. 15, 2005, pp. 1-4.
Wallace DK et al. "A randomized trial to evaluate 2 hours of daily patching for strabismic and anisometropic amblyopia in children." *Ophthalmology* v. 113, No. 6, Jun. 2006, pp. 904-912.
Yamada et al. "Development of an eye-movement analyser possessing functions for wireless transmission and autocalibration," Med. Biol. Eng. Comput., No. 28, v.4, Jul. 28, 1990, http://link.springer.com/article/10.1007%2FBF02446149?LI=true, pp. 1-2.
Office Action for U.S. Appl. No. 14/703,875, dated Oct. 2, 2018.
Office Action for U.S. Appl. No. 14/703,875, dated Mar. 15, 2019.
Office Action for U.S. Appl. No. 14/703,875, dated Jul. 26, 2019.
Advisory Action for U.S. Appl. No. 14/703,875, dated Sep. 27, 2019.
Notice of Allowance for U.S. Appl. No. 14/703,875, dated Jan. 13, 2020.
Notice of Allowance for U.S. Appl. No. 16/382,036, dated Feb. 24, 2020.
Notice of Allowance for U.S. Appl. No. 16/382,036, dated May 18, 2020.

\* cited by examiner

ELECTRONIC EYEWEAR AND DISPLAY

CROSS-REFERENCE TO RELATED APPLICATIONS

This application is a continuation of U.S. patent application Ser. No. 14/211,491, filed Mar. 14, 2014, and entitled "ELECTRONIC EYEWEAR AND DISPLAY," which is hereby incorporated herein by reference, which in turn claims priority to U.S. Patent Application No. 61/792,702, filed Mar. 15, 2013, and entitled "ELECTRONIC EYEWEAR AND DISPLAY," which is hereby incorporated herein by reference.

FIELD OF THE DESCRIBED EMBODIMENTS

The described embodiments relate generally to electronic eyewear. More particularly, the described embodiments relate to apparatuses, methods and systems for electronic eyewear that includes a display.

BACKGROUND OF THE INVENTION

It is desirable to have methods, systems and apparatuses for providing electronic eyewear that includes a display.

SUMMARY OF THE INVENTION

In one embodiment, an eyewear apparatus includes a display and a frame. The frame includes a side region that includes an extendable arm. The first end of the extendable arm is attached to the frame and a second end of the extendable arm is attached to the display. The side region includes a cavity, where the extendable arm is adapted to retract back. The extendable arm is further adapted to extend out of the cavity and orient the display to be visually observable by a user of the eyewear apparatus.

In another embodiment, an eyewear apparatus includes a concave reflective and an image source. The image source and the concave reflective surface are oriented to enable a user of the eyewear apparatus to view at least an image from the image source as reflected by the concave reflective surface. In one embodiment, the apparatus includes a lens. The concave reflective surface can be integral with the lens. In another embodiment, the apparatus includes a frame. The concave reflective surface can be in the frame. In another embodiment, the frame includes an extendable arm with a first end and a second end. The first end of the extendable arm is configured to be attached to the frame, and the concave reflective surface is configured to be in the vicinity of the second end. Yet another embodiment includes a lens, an additional image source and an additional concave reflective surface, with the additional source and surface being located at opposite sides of the lens. In one embodiment, the eyewear apparatus is in a module.

Other aspects and advantages of the present invention will become apparent from the following detailed description, which, when taken in conjunction with the accompanying drawings, illustrates by way of example the principles of the invention.

Same numerals in FIGS. 1-9 are assigned to similar elements in all the figures. Embodiments of the invention are discussed below with reference to FIGS. 1-9. However, those skilled in the art will readily appreciate that the detailed description given herein with respect to these figures is for explanatory purposes as the invention extends beyond these limited embodiments.

DETAILED DESCRIPTION OF THE INVENTION

One embodiment includes an electronic eyewear with a display. The electronic eyewear includes a side region and a front region, and the display can be attached to the side region of the eyewear. In one embodiment, the side region includes a temple region. In another embodiment, the eyewear includes a front region with two sides, and two side regions, one connected to each side of the front region.

In different embodiments, an electronic eyewear can be, for example, a pair of sunglasses, fit-over glasses, prescription glasses, safety glasses, goggles, such as ski goggles, and "frame-less" glasses; an auxiliary frame, and a swim mask; and an electronic apparatus wearable by a user in the vicinity of one or both eyes of the user.

In one embodiment, the electronic eyewear includes at least a front region and a side region. The front region is configured to be in front of the user wearing the electronic eyewear. The side region is configured to be on a side of the user wearing the electronic eyewear.

Figure 1:
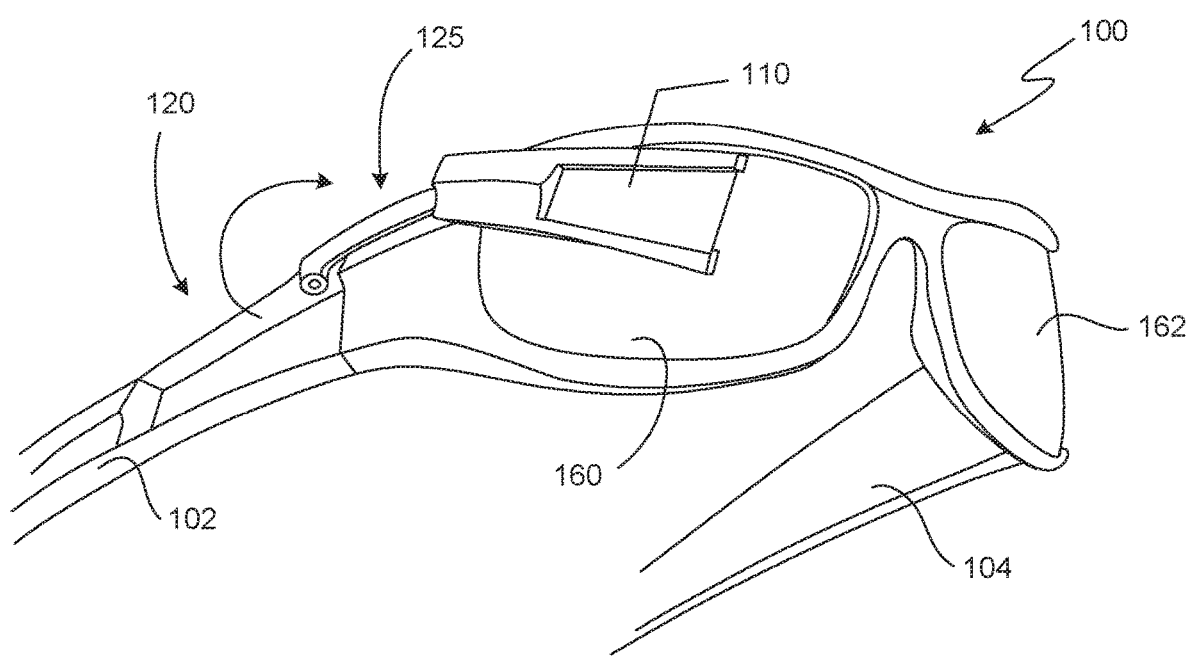
FIG. 1 shows an electronic eyewear that includes a display, according to an embodiment of the invention.

FIG. 1 shows a block diagram of an electronic eyewear according to one embodiment. For this embodiment, the electronic eyewear includes a frame 100 that includes a pair of temples or arms 102, 104; and a lens holder adaptable to hold one or more lenses (for example, lenses 160, 162). In one embodiment, a "frame-less" glasses can be an eyewear with two lenses connected by a bridge, with each lens also connected to an arm or temple.

While two lenses 160, 162 are depicted in FIG. 1, the electronic eyewear can include a single eye-piece forming goggles rather than the standard lenses of glasses. As an example, the lens could be a single wrap-around lens. For an embodiment, the frame 100 is adaptable to hold one or more lenses, such as, lenses 160, 162.

In another embodiment, the frame 100 includes a connecting piece between lenses such as in a pair of frame-less glasses.

As shown, the frame 100 further includes a display 110. For example, at least one of the arms 102, 104 includes a region 120 that includes an extendable arm 125, wherein a first end of the extendable arm 125 is attached to the temple region 120 and a second end of the extendable arm 125 is attached to the display 110.

An embodiment includes an eyewear apparatus. The eyewear apparatus includes a frame, and a display. For an embodiment, the frame includes a side region that includes an extendable arm, wherein a first end of the extendable arm is attached to the frame and a second end of the extendable arm is attached to the display.

For an embodiment, a temple region 120 or a side region of the eyewear includes a cavity, wherein the extendable arm 125 is adapted to retract back to the cavity, and can fit within or substantially within the cavity. For an embodiment, the extendable arm 125 is further adapted to extend out of the cavity and orient the display 110 to be visually observable by a user of the eyewear apparatus. For an embodiment, the extendable arm 125 includes at least one rotatable joint, allowing adjustment of a distance between the display 110 and the one or more lenses 160, 162.

For an embodiment, the extendable arm 125 includes at least one rotatable joint, allowing adjustment of an orientation of the display 110 relative to the one or more lenses. For an embodiment, the extendable arm 125 includes at least one rotatable joint, allowing adjustment of an orientation of a viewing plane of the display 110 relative to a frontal plane of the one or more lenses, or relative to a frontal plane of the lens holder. For an embodiment, a retracted state of the electronic eyewear includes the extendable arm 125 retracted into the cavity. For an embodiment, a user-activated action causes the extendable arm 125 to pop out, or to extend out, of the cavity. In one embodiment, the extendable arm 125 can be user-adjusted.

For an embodiment, an extendable arm includes two or more pieces, wherein at least two of the pieces are connected at endpoints, wherein the pieces rotatably adjust at the endpoints. For an embodiment, a first piece rotatably connected to the temple region and a last piece is rotatably connected to the display.

For an embodiment, at least one conductor extends through the extendable arm, electronically connecting the display to a controller location within the eyewear.

For an embodiment, the display 110 includes an LCD display.

For an embodiment, the display 110 includes a projection screen. For an embodiment, the apparatus further includes a projector for displaying images on the projection screen.

For an embodiment, the apparatus further includes light-guide optical element operative to display images on the display.

In one embodiment, the different attributes of the different embodiments of the electronic eyewear can be programmable, such as via switches on the corresponding eyewear, or wirelessly via a remote control, or both. Examples of switches on a frame can include a knob, a slider or a small dial on the corresponding frame to program the electronic eyewear.

Figure 2:
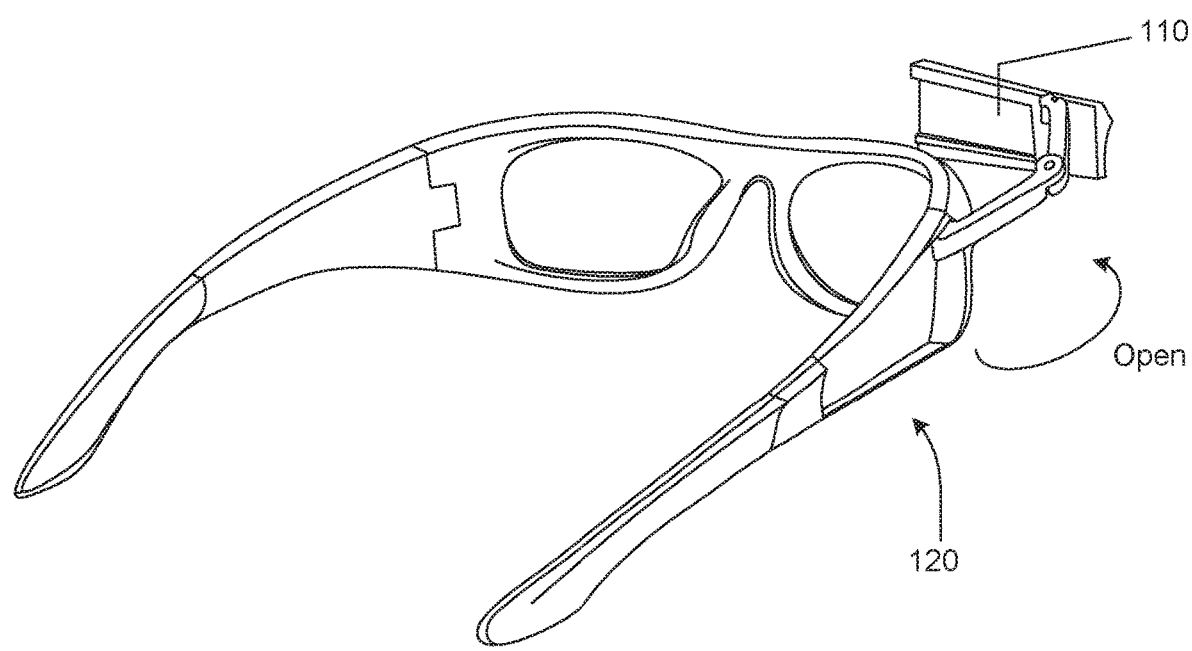
FIG. 2 shows an alternate view of the electronic eyewear of FIG. 1 that includes the display, according to an embodiment of the invention.

FIG. 2 shows an alternate view of the electronic eyewear of FIG. 1 that includes the display, according to an embodiment.

Figure 3:
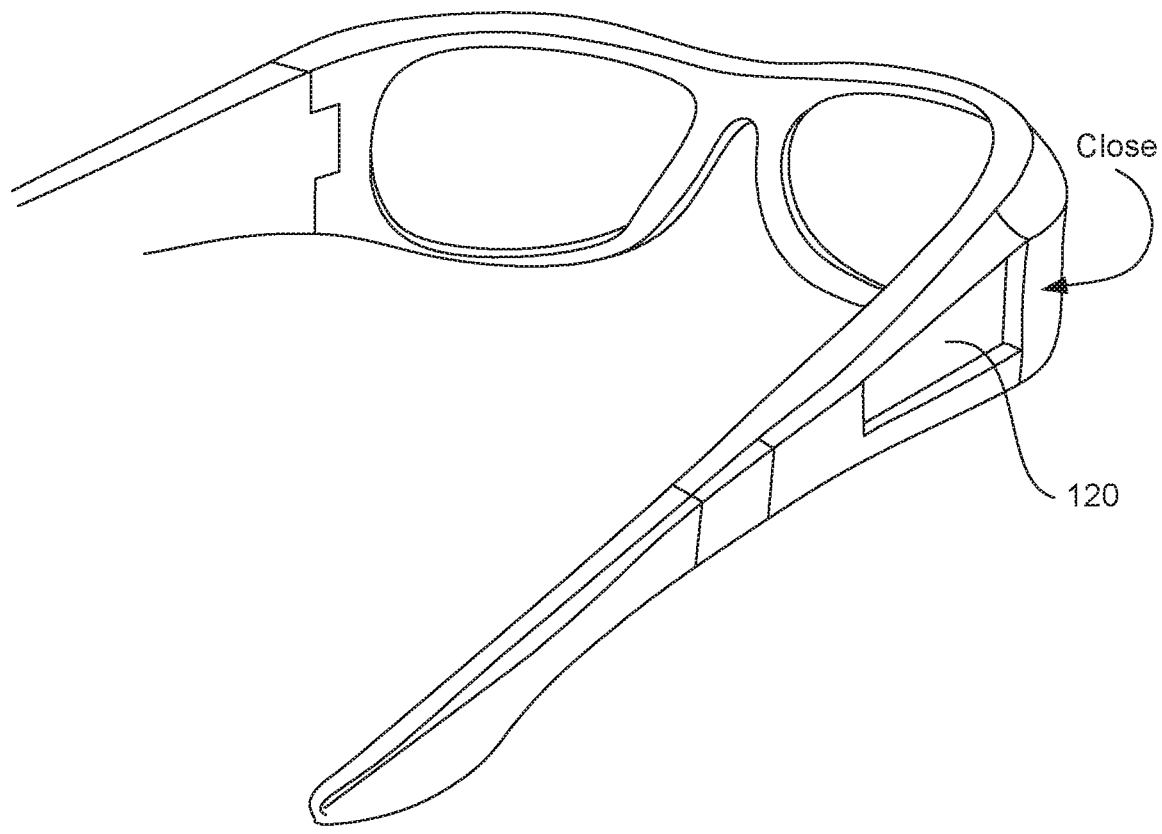
FIG. 3 shows the electronic eyewear of FIGS. 1 and 2, wherein the display is at least partially embedded in a temple region of the electronic eyewear, according to an embodiment of the invention.

FIG. 3 shows the electronic eyewear of FIGS. 1 and 2, wherein the display is at least partially embedded in, or concealed within, a temple region of the electronic eyewear, according to an embodiment.

Figure 4:
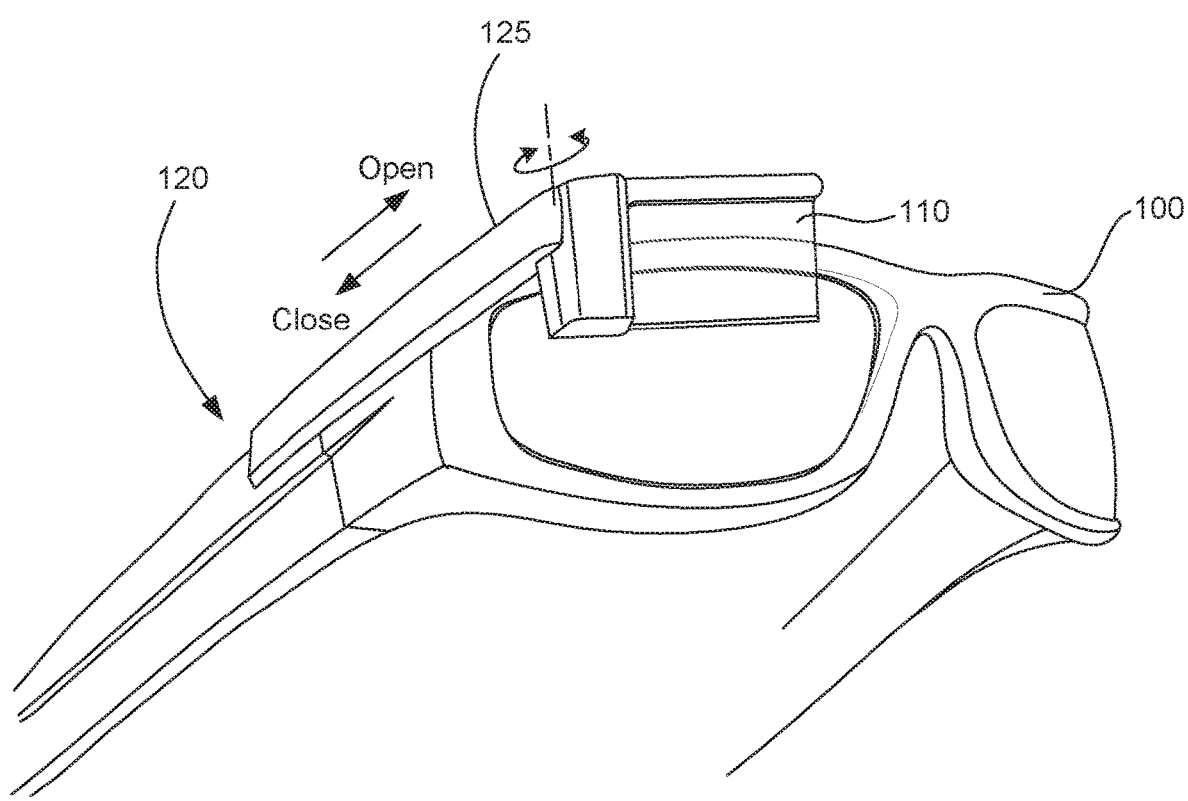
FIG. 4 shows an electronic eyewear that includes a display, according to an embodiment of the invention.

FIG. 4 shows an electronic eyewear that includes a display, according to an embodiment.

Figure 5:
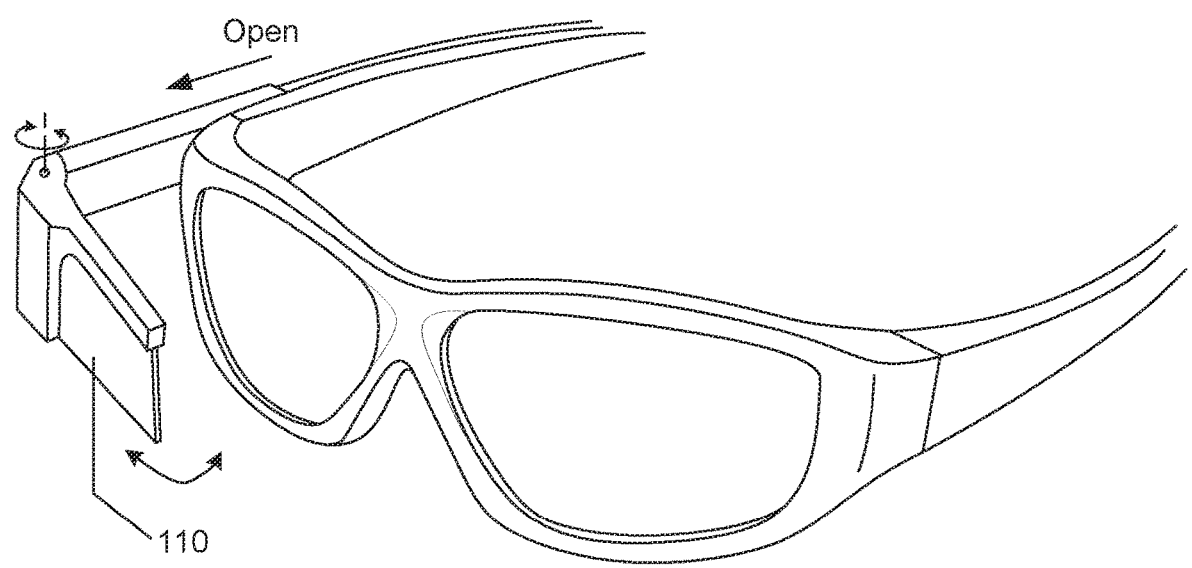
FIG. 5 shows an alternate view of the electronic eyewear of FIG. 4 that includes the display, according to an embodiment of the invention.

FIG. 5 shows an alternate view of the electronic eyewear of FIG. 4 that includes the display, according to an embodiment.

Figure 6:
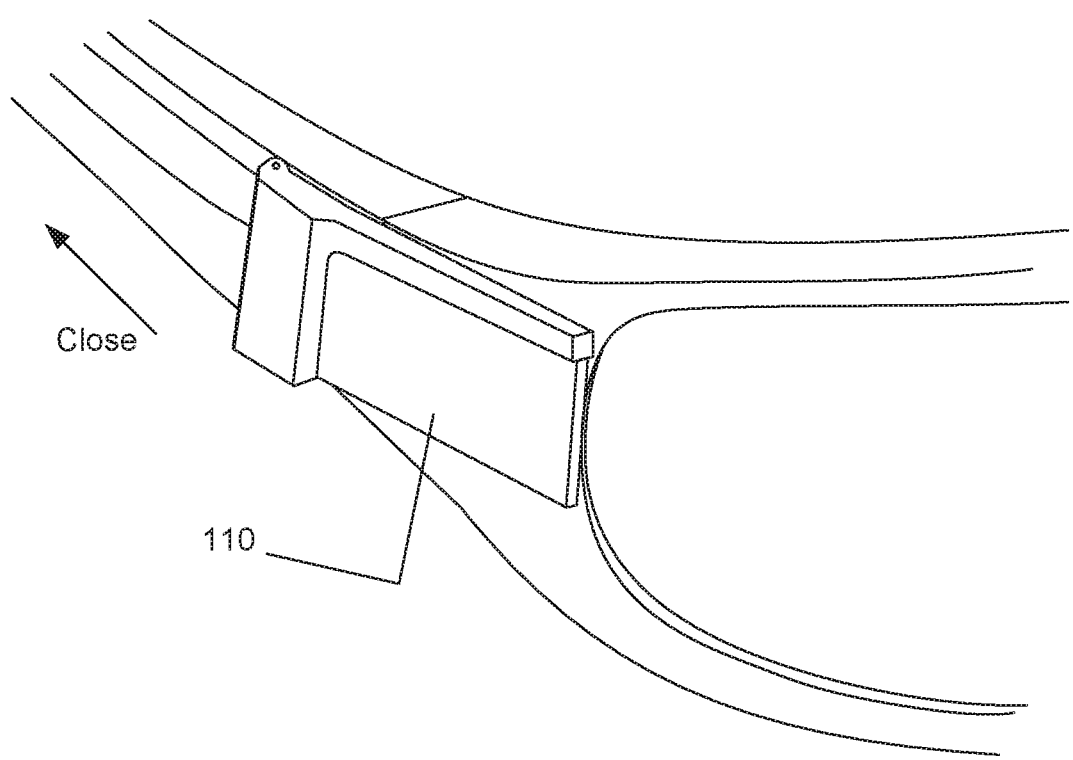
FIG. 6 shows the electronic eyewear of FIGS. 4 and 5, wherein the display is at least partially embedded in a temple region of the electronic eyewear, according to an embodiment of the invention.

FIG. 6 shows the electronic eyewear of FIGS. 4 and 5, wherein the display is at least partially embedded in, or concealed within, a temple region of the electronic eyewear, according to an embodiment.

In one embodiment, the electronic eyewear includes at least one focusing lens between the display and an eye of the wearer. The focusing lens helps focus the image from the display to the eye. The focusing lens can be a Fresnel lens. In one embodiment, the electronic eyewear includes at least one lens as in a lens of a pair of glasses; and the focusing lens is built into the at least one lens.

In one embodiment, electronics for the electronic eyewear is in an eyewear frame. In another embodiment, the electronic eyewear with the corresponding electronics, such as the control circuitry, can be in a secondary frame, which is attachable to a primary frame via different mechanisms, such as magnets. The primary frame can include a pair of prescription lenses. To illustrate, there can be a housing or a chassis holding prescription lenses, with the electronic eyewear provided on the outside, such as via a clip-on.

In one embodiment, the electronic eyewear with the corresponding control circuitry and power source can be in a fit-over frame that can fit over another frame.

In one embodiment, the electronic eyewear can include prescription lenses providing focal correction, such as bi-focal, tri-focal, prism, etc.

In one embodiment, the electronic eyewear is rechargeable or includes power sources, such as a battery, to allow the eyewear to perform its operation over a duration of time, such as a few hours.

One embodiment further includes monitoring if the user is wearing the eyewear. In one embodiment, the electronic eyewear includes a time sensor that times at least one of how long and how frequently the user wears the eyewear. For an embodiment, the time sensor is attached to, integral with, or being a part of the electronic eyewear. For an embodiment, information related to the monitoring/sensing of the eyewear is stored, such as in the eyewear. For an embodiment, after stored, the monitoring information can be later retrieved, for example, by a doctor or physician to allow the physician to determine or gauge the compliance (e.g. duration of time of wearing the eyewear) by the user with a therapy suggested by the doctor or physician. The retrieval can be performed through a wire connection (e.g. via an electrical connector at the eyewear) or wirelessly (e.g. via an infrared sensor or a wireless transceiver at the eyewear).

In one embodiment, a motion detector is used as the "being worn" sensor. A threshold can be set, such that if the amount of motion exceeds the threshold, the eyewear is assumed to be worn. The motion detector can, for example, be achieved by a mechanical means or an accelerometer.

In another embodiment, the "being worn" sensor includes two thermal sensors. One sensor can be at approximately the middle or close to one end of an arm, such as in a region that touches the head of the user wearing the eyewear. The other sensor can be at the other end of the arm, such as close to lens holder of the eyewear. If the temperature differential between the two sensors is beyond a certain preset value, the eyewear would be assumed to be worn. The differential is presumed to be caused by a person wearing the eyewear.

In yet another embodiment, the eyewear includes at least one hinge, and the hinge is configured to allow an arm of the eyewear to be foldable. In one embodiment, the "being worn" sensor includes a stress sensor at the hinge of the arm. The assumption is that when the eyewear is worn, the hinge is typically slightly stretched because typically, the width of the head of the user is slightly wider than the width between the arms when the two arms are in the extended positions. If the value of the stress sensor is beyond a certain preset value, the eyewear would be assumed to be worn.

In a further embodiment, the "being worn" sensor can be a switch. For example, at the hinge between an arm and its corresponding lens holder, there is a switch. When that temple is fully extended outwards, the switch is turned on. The switch can be a pin. When the temple is fully extended outwards, the pin is pressed. When both arms are fully extended outwards, in one embodiment, the eyewear would be assumed to be worn by the user.

In one embodiment, the electronic eyewear includes one or more lenses based on liquid crystal lens technologies.

In one embodiment, the electronic eyewear may be secured from the back with a functional strap, such as a lanyard. In one embodiment, the lanyard may contain the electronics, such as control circuitry and power source, of the electronic eyewear. This can provide additional ergonomic qualities and securing for active users.

Figure 7:
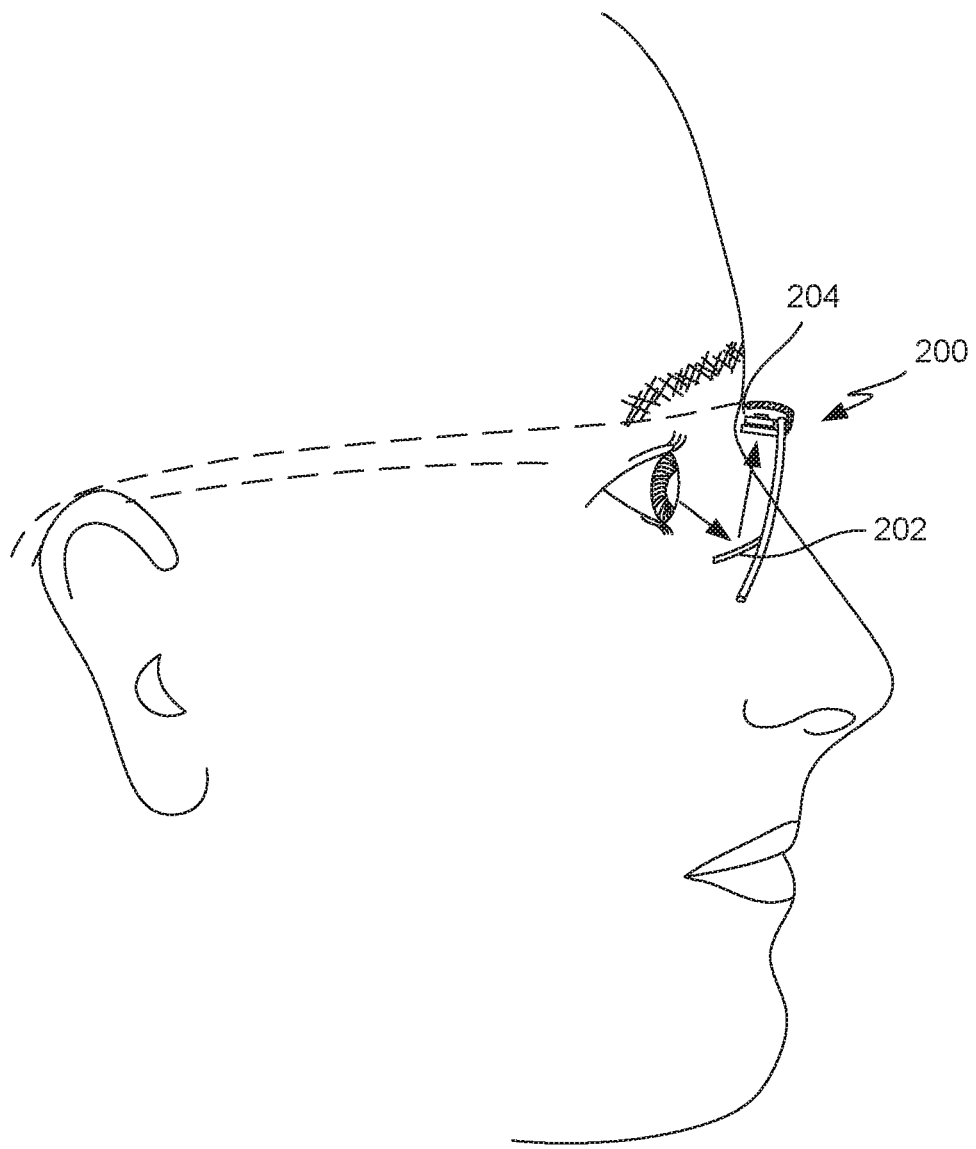
FIG. 7 shows an embodiment of an electronic display apparatus for eyewear that includes a concave reflective surface and an image source.

FIG. 7 shows an embodiment of an electronic display apparatus for eyewear 200 includes a concave reflective surface 202 and an image source 204. The image source 204 could include a liquid crystal display (LCD) or a light emitting diode type of display (LEDD), with a circuit board having electronics attached. The image source 204 and the concave reflective surface 202 can be configured to be oriented to enable a user of the electronic display apparatus to view at least an image from the image source 204 as reflected by the concave reflective surface 202.

In one embodiment, the electronic display apparatus for eyewear is adapted or configured for an electronic eyewear.

In one embodiment, the electronic display apparatus for eyewear includes at least one lens. In one embodiment, at least a portion of a concave reflective surface is integrated with the at least one lens. For example, the at least one lens can include a transparent portion and the at least a portion of the concave reflective surface. In another embodiment, such as for a pair of sunglasses, the at least one lens can include a near-transparent portion and the at least a portion of the concave reflective surface. In yet another embodiment, the at least one lens can include a substantially non-reflective portion (which could be transparent or near-transparent) and the at least a portion of the concave reflective surface.

At least a portion of the concave reflective surface and at least a portion of the image source can be located on opposite sides of the at least one lens. For example, the at least a portion of the concave reflective surface is at an upper portion of the at least one lens, while the at least a portion of the image source is at the vicinity around a lower portion of the at least one lens. In another example, at least a portion of the concave reflective surface and at least a portion of the image source are located in the vicinity on a same side of the at least one lens.

In yet another embodiment, the at least one lens is configured to be located between the image source and the concave reflective surface, and is configured to enable a user of the eyewear apparatus to view at least an image from the image source as reflected by the concave reflective surface.

In one embodiment, the electronic display apparatus for eyewear includes a frame, and at least a portion of the concave reflective surface is in or integral with the frame. The apparatus also can include at least one lens. In one embodiment, at least a portion of the concave reflective surface, or at least a portion of the image source, or both, are at the frame. The at least a portion of the concave reflective surface, and the at least a portion of the image source both can be located in the vicinity of the opposite sides of the at least one lens. For example, the at least a portion of the concave mirror is at the frame, adjacent to an upper portion of the at least one lens; and the at least a portion of the image source is at the frame, adjacent to a lower portion of the at least one lens.

Figure 8A:
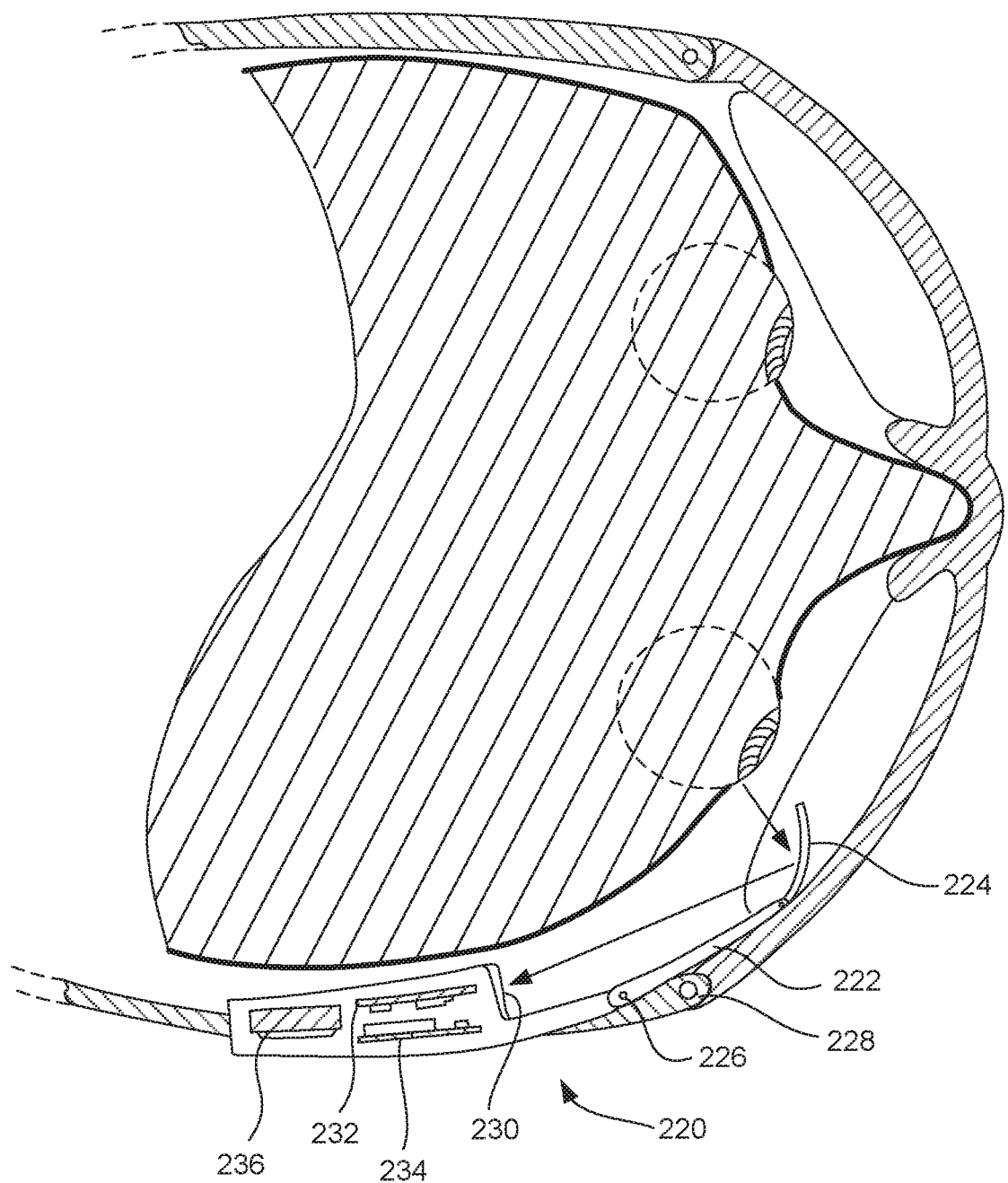
FIG. 8A-8B show different embodiments of an electronic display apparatus for eyewear that includes an extendable arm that is extended.
Figure 8B:
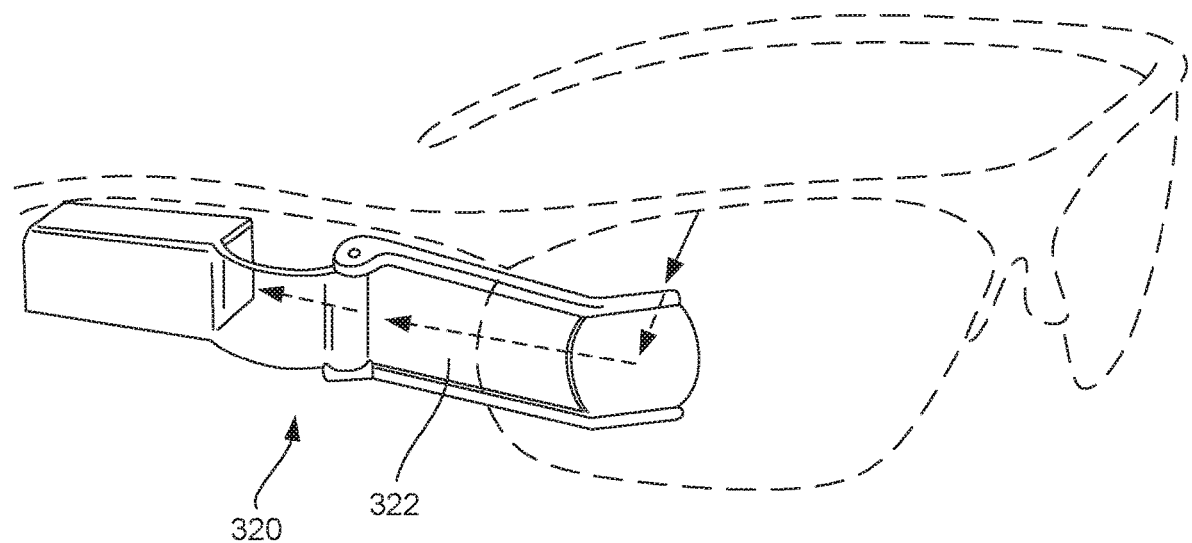

FIGS. 8*a* and 8*b* show different embodiments of an electronic display apparatus for eyewear including an extendable arm that are extended. For example, FIG. 8*a* shows an embodiment 220 of an electronic display apparatus for eyewear that includes an extendable arm 222. The electronic display apparatus for eyewear can also includes a frame with a side region, wherein at least a portion of an image source is in the side region of the frame. The extendable arm has a first end and a second end. The first end of the arm 222 is configured to be attached to the frame, and a concave reflective surface 224 is configured to be attached in the vicinity of the second end. In one embodiment, the frame includes one or more lenses, such as in a pair of glasses.

In FIG. 8*a*, the extendable arm 222 is configured to be on the inside of the frame, and when extended, the concave reflective surface 224 is positioned behind at least one of the lenses, in between the at least one lenses and the user wearing the frame.

In the embodiment shown in FIG. 8*a*, the extendable arm 222 includes a pivot 226. The pivot 226 can be configured to be behind the pivot 228 of the frame when the frame 228 is worn.

In another embodiment, an extendable arm is on the outside of a frame, and when extended, the concave reflective surface is in front of at least one of the lenses. In this embodiment, the at least one of the lenses is located in between the concave reflective surface and the user when the extendable arm is extended.

In one embodiment, the electronic display apparatus for eyewear includes more than one image source. In another embodiment, the electronic display apparatus for eyewear includes more than one concave reflective surfaces. For example, each image source can be configured to operate with a corresponding concave reflective surface. For each image source and the corresponding concave reflective surface, at least a portion of the image source and at least a portion of its corresponding concave reflective surface can be located in the vicinity of the opposite sides of at least one lens.

Figure 9:
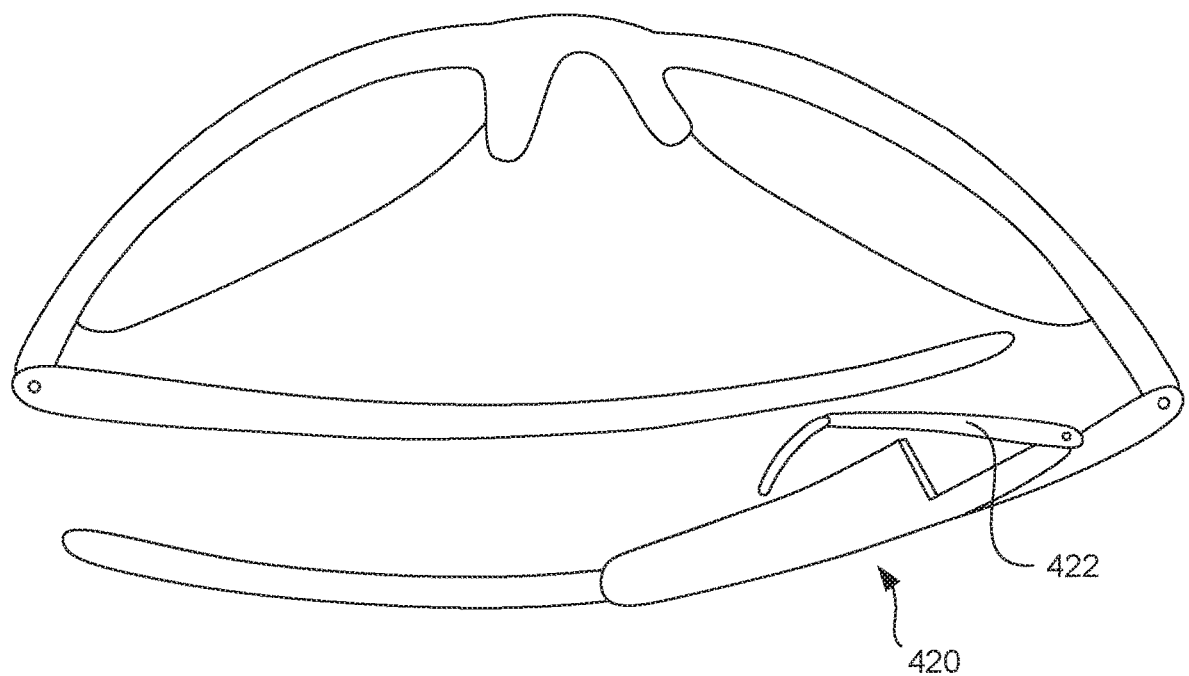
FIG. 9 shows an embodiment of an electronic display apparatus for eyewear that includes an extendable arm that is retracted.

FIG. 8*b* shows an embodiment 320 of an electronic display apparatus for eyewear including an extendable arm 322 that is extended. FIG. 9 shows an embodiment, 420 of an electronic display apparatus for eyewear including an extendable arm 422 that is retracted.

In one embodiment, an electronic display apparatus for eyewear is configured to be in a module. FIGS. 8A and 8B show such an example. In the example shown in FIG. 8*a*, the module 220 can include an image source, such as a LCD 230, with circuit boards, 232 and 234, and a battery 236. In another embodiment, the module can be integrated into a frame, such as the frame of a pair of glasses.

The various embodiments, implementations and features of the invention noted above can be combined in various ways or used separately. Those skilled in the art will understand from the description that the invention can be equally applied to or used in other various different settings with respect to various combinations, embodiments, implementations or features provided in the description herein.

Numerous specific details are set forth in order to provide a thorough understanding of the present invention. However, it will become obvious to those skilled in the art that the invention may be practiced without these specific details. The description and representation herein are the common meanings used by those experienced or skilled in the art to most effectively convey the substance of their work to others skilled in the art. In other instances, well-known methods, procedures, components, and circuitry have not been described in detail to avoid unnecessarily obscuring aspects of the present invention.

Also, in this specification, reference to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

What is claimed is:

1. An eyewear apparatus, comprising:
an eyewear frame for supporting at least a lens; and
at least an image source, including at least a circuit board having at least an electrical component attached thereon, configured to produce at least an image, with at least a portion of the at least an image source being in the eyewear frame,
wherein the at least an image source and at least a concave reflective surface of the eyewear apparatus are oriented to enable a user of the eyewear apparatus to see at least the image from the at least an image source at least as reflected by the at least a concave reflective surface,
wherein the at least an image source is configured to be positioned above the center of the at least a concave reflective surface when the eyewear frame is worn, to enable the user of the eyewear apparatus to see at least the image from the at least an image source at least as reflected by the at least a concave reflective surface, and
wherein the center of the at least a concave reflective surface is configured to be positioned off from the center of the at least a lens.

2. The eyewear apparatus of claim 1 comprising at least a battery, wherein the at least an image source and at least the battery are in a module.

3. The eyewear apparatus of claim 2, wherein at least a portion of the module is configured to be in the eyewear frame.

4. The eyewear apparatus of claim 1,
wherein the eyewear frame includes the at least a lens, and
wherein the at least a concave reflective surface is a part of the at least a lens.

5. The eyewear apparatus of claim 4 comprising at least a battery, wherein the at least an image source and at least the battery are in a module.

6. The eyewear apparatus of claim 5, wherein at least a portion of the module is configured to be in the eyewear frame.

7. The eyewear apparatus of claim 1 comprising a sensor with at least an electrical component configured to sense at least an attribute regarding the user, wherein at least an operation of the at least an image source is based on at least an output of the sensor, and wherein at least a portion of the sensor is in the eyewear frame.

8. The eyewear apparatus as recited in claim 7 comprising:
at least a battery,
wherein the eyewear frame includes the at least a lens,
wherein the at least an image source and at least the battery are in a module,
wherein at least a portion of the module is configured to be in the eyewear frame, and
wherein the at least a concave reflective surface is a part of the at least a lens.

9. An eyewear apparatus, comprising:
an eyewear frame including at least a lens and at least a concave reflective surface; and
at least an image source, including at least a circuit board having at least an electrical component attached thereon, configured to produce at least an image, with at least a portion of the at least an image source being in the eyewear frame,
wherein the at least an image source and the at least a concave reflective surface are oriented to enable a user of the eyewear apparatus to see at least the image from the at least an image source at least as reflected by the at least a concave reflective surface,
wherein the at least an image source is configured to be positioned above the center of the at least a concave reflective surface when the eyewear frame is worn, to enable the user of the eyewear apparatus to see at least the image from the at least an image source at least as reflected by the at least a concave reflective surface, and
wherein the center of the at least a concave reflective surface is configured to be positioned off from the center of the at least a lens.

10. The eyewear apparatus as recited in claim 9 comprising a sensor configured to sense at least an attribute of the user, wherein at least a portion of the sensor is in the eyewear frame.

11. An eyewear apparatus, comprising:
an eyewear frame for supporting at least a lens; and
at least an image source, including at least a circuit board having at least an electrical component attached thereon, configured to produce at least an image, with at least a portion of the at least an image source being in the eyewear frame,
wherein at least a part of the at least a lens is configured to operate as at least a concave reflective surface,
wherein the at least an image source and the at least a concave reflective surface are oriented to enable a user of the eyewear apparatus to see at least the image from the at least an image source at least as reflected by the at least a concave reflective surface,
wherein the at least an image source is configured to be positioned above the center of the at least a concave reflective surface when the eyewear frame is worn, to enable the user of the eyewear apparatus to see at least the image from the at least an image source at least as reflected by the at least a concave reflective surface, and wherein the center of the at least a concave reflective surface is configured to be positioned off from the center of the at least a lens.

12. The eyewear apparatus of claim 11, wherein the at least an image source is configured to be in the vicinity of a top portion of the at least a lens.

13. The eyewear apparatus of claim 11 comprising at least another image source configured to produce at least another image, with at least a portion of the at least another image source being in the eyewear frame, wherein the at least another image source and at least another concave reflective surface of the eyewear apparatus are oriented to enable the user of the eyewear apparatus to see the at least another image from the at least another image source at least as reflected by the at least another concave reflective surface.

14. The eyewear apparatus of claim 11 comprising a being-worn sensor configured to help determine whether the eyewear is being worn, wherein at least a portion of the being-worn sensor is in the eyewear frame.

15. The eyewear apparatus of claim 14, wherein the being-worn sensor includes a motion sensor.

16. The eyewear apparatus of claim 11 comprising a sensor configured to sense at least an attribute of the user, wherein at least a portion of the sensor is in the eyewear frame.

17. The eyewear apparatus of claim 12 comprising a sensor configured to sense at least an attribute of the user, wherein at least a portion of the sensor is in the eyewear frame.

18. The eyewear apparatus of claim 17 comprising at least another image source configured to produce at least another image, with at least a portion of the at least another image source being in the eyewear frame, wherein the at least another image source and at least another concave reflective surface of the eyewear apparatus are oriented to enable the user of the eyewear apparatus to see the at least another image from the at least another image source at least as reflected by the at least another concave reflective surface.

19. The eyewear apparatus of claim 18 comprising a being-worn sensor configured to help determine whether the eyewear is being worn, wherein at least a portion of the being-worn sensor is in the eyewear frame.

20. The eyewear apparatus of claim 13 comprising a sensor configured to sense at least an attribute of the user, wherein at least a portion of the sensor is in the eyewear frame.

21. The eyewear apparatus of claim 20 comprising a being-worn sensor configured to help determine whether the eyewear is being worn, wherein at least a portion of the being-worn sensor is in the eyewear frame.

22. The eyewear apparatus of claim 1, wherein the at least an image source is configured to be in the vicinity of a top portion of the at least a lens.

23. The eyewear apparatus of claim 22 comprising a sensor configured to sense at least an attribute of the user, wherein at least a portion of the sensor is in the eyewear frame.

24. The eyewear apparatus of claim 23 comprising at least another image source configured to produce at least another image, with at least a portion of the at least another image source being in the eyewear frame, wherein the at least another image source and at least another concave reflective surface of the eyewear apparatus are oriented to enable the user of the eyewear apparatus to see the at least another image from the at least another image source at least as reflected by the at least another concave reflective surface.

25. The eyewear apparatus of claim 24 comprising a being-worn sensor configured to help determine whether the eyewear is being worn, wherein at least a portion of the being-worn sensor is in the eyewear frame.

26. The eyewear apparatus of claim 1 comprising at least another image source configured to produce at least another image, with at least a portion of the at least another image source being in the eyewear frame, wherein the at least another image source and at least another concave reflective surface of the eyewear apparatus are oriented to enable the user of the eyewear apparatus to see the at least another image from the at least another image source at least as reflected by the at least another concave reflective surface.

27. The eyewear apparatus of claim 26 comprising a sensor configured to sense at least an attribute of the user, wherein at least a portion of the sensor is in the eyewear frame.

28. The eyewear apparatus of claim 27 comprising a being-worn sensor configured to help determine whether the eyewear is being worn, wherein at least a portion of the being-worn sensor is in the eyewear frame.

29. The eyewear apparatus of claim 11, wherein the at least a lens includes a wrap-around lens.

30. The eyewear apparatus of claim 11, wherein the eyewear apparatus includes at least a timer in the eyewear frame, the timer configured to measure a duration of time regarding a usage of the eyewear apparatus by the user.

31. The eyewear apparatus of claim 11, wherein the eyewear apparatus includes at least a motion sensor in the eyewear frame, the at least a motion sensor configured to measure at least a motion of the user.

32. The eyewear apparatus of claim 31, wherein the at least a motion sensor includes at least an accelerometer.

33. The eyewear apparatus of claim 11, wherein with the at least a part of the at least a lens to operate as the at least a concave reflective surface, the eyewear apparatus enables the user to see the at least an image from the at least an image source and at the same time to see through the at least a lens.

34. An eyewear apparatus for a user, comprising:
an eyewear frame for supporting at least a lens;
at least a timer in the eyewear frame, the timer configured to measure a duration of time regarding a usage of the eyewear apparatus by the user;
at least a motion sensor in the eyewear frame, the at least a motion sensor configured to measure at least a motion of the user, wherein the at least a motion sensor includes at least an accelerometer; and
at least an image source, including at least a circuit board having at least an electrical component attached thereon, configured to produce at least an image, with at least a portion of the at least an image source being in the vicinity of a top portion of the at least a lens,
wherein at least a part of the at least a lens is configured to operate as at least a concave reflective surface,
wherein the at least an image source and the at least a concave reflective surface are oriented to enable the user of the eyewear apparatus to see at least the image from the at least an image source at least as reflected by the at least a concave reflective surface,
wherein the at least an image source is configured to be positioned above the center of the at least a concave reflective surface when the eyewear frame is worn, to enable the user of the eyewear apparatus to see at least the image from the at least an image source at least as reflected by the at least a concave reflective surface, wherein the center of the at least a concave reflective surface is configured to be positioned off from the center of the at least a lens, and wherein with the at least a part of the at least a lens to operate as the at least a concave reflective surface, the eyewear apparatus enables the user to see the at least an image from the at least an image source and at the same time to see through the at least a lens.

35. An eyewear apparatus of claim 34, wherein the at least a lens includes a wrap-around lens.

\* \* \* \* \*